(12) United States Patent
Yang et al.

(10) Patent No.: US 11,921,015 B2
(45) Date of Patent: Mar. 5, 2024

(54) DEVICE FOR SAMPLING SOIL OF TROPICAL LOWLAND RAINFOREST

(71) Applicant: International Center for Bamboo and Rattan, Beijing (CN)

(72) Inventors: Huai Yang, Beijing (CN); Wenjie Liu, Beijing (CN); Qiu Yang, Beijing (CN); Hairong Yao, Beijing (CN)

(73) Assignee: International Center for Bamboo and Rattan (CN)

( * ) Notice: Subject to any disclaimer, the term of this patent is extended or adjusted under 35 U.S.C. 154(b) by 838 days.

(21) Appl. No.: 16/997,088

(22) Filed: Aug. 19, 2020

(65) Prior Publication Data
US 2022/0057300 A1    Feb. 24, 2022

(51) Int. Cl.
*G01N 1/08* (2006.01)
*E21B 25/10* (2006.01)
*G01N 1/10* (2006.01)

(52) U.S. Cl.
CPC .............. *G01N 1/08* (2013.01); *E21B 25/10* (2013.01); *G01N 2001/1031* (2013.01)

(58) Field of Classification Search
CPC .......... E21B 25/00; E21B 25/10; E21B 25/12; E21B 25/14; G01N 1/08; G01N 2001/1031
See application file for complete search history.

(56) References Cited

U.S. PATENT DOCUMENTS

| | | | | |
|---|---|---|---|---|
| 1,456,983 | A * | 5/1923 | Hansen | E21B 10/44 175/323 |
| 2,812,160 | A * | 11/1957 | West | E21B 25/08 175/310 |
| 3,095,051 | A * | 6/1963 | Robinsky | E21B 10/44 175/323 |
| 3,830,320 | A * | 8/1974 | Van Der Wijden | E21B 25/00 175/241 |
| 5,673,762 | A * | 10/1997 | Pennington | E21B 49/02 175/58 |
| 2016/0153869 | A1* | 6/2016 | Niu | E21B 25/10 73/864.74 |

* cited by examiner

*Primary Examiner* — Robert E Fuller
(74) *Attorney, Agent, or Firm* — Kim IP Law Group LLC

(57) ABSTRACT

A device for sampling soil of tropical lowland rainforest is provided, and the device includes a driving motor, a probe rod and a sampling barrel. An output shaft of the driving motor is fixedly connected with the top end of the probe rod. The probe rod is hollow. The sampling barrel is disposed in the probe rod. An opening of the bottom end of the sampling barrel faces to the soil inlet. Two baffle plates are also arranged in the probe rod. The side wall of the baffle plate is arc-shaped, and the bottom end of the baffle plate is semicircular. The semicircular baffle plates can pass through the space and can be joined to form a cylinder with a closed bottom end. Two linear motors are fixedly arranged in the probe rod and can respectively drive the two baffle plates to move.

9 Claims, 3 Drawing Sheets

DEVICE FOR SAMPLING SOIL OF TROPICAL LOWLAND RAINFOREST

TECHNICAL FIELD

The present invention relates to the technical field of soil detection of the tropical lowland rainforest, and in particular to a device for sampling soil of tropical lowland rainforest.

BACKGROUND

Soil sampling is an important groundwork of the ecological research, and a soil sampler is a special tool for the soil detection. The soil sampler in the prior art has the following defects: (1), the sampled soil is easy to drop down, so the success rate of soil sampling is low; (2), to sample the lower soil, the soil sampler needs to penetrate through the surface layer such that the sampled soil in a sampling barrel usually mixes the soil of the surface layer, thereby affecting the accuracy of experimental data of the lower soil detection; (3), because the soil of the tropical lowland rainforest contains some gravels, a common sampling rod is difficult to drill and wastes time and labor during the drilling, and a spiral sampling rod may break the structural integrity of the soil during the drilling so as to influence the soil detection result.

SUMMARY

The objective of the present invention is to provide a device for sampling soil of tropical lowland rainforest, which solves the problems in the prior art and improves the efficiency and the success rate of sampling the soil, in particular the deep soil, of the tropical lowland rainforest.

To achieve the above objective, the present invention provides the following solution:

The present invention provides a device for sampling soil of tropical lowland rainforest, comprising a driving motor, a probe rod and a sampling barrel. An output shaft of the driving motor is fixedly connected with the top end of the probe rod. A spiral coil is fixedly arranged on the outer wall of the probe rod. The probe rod is hollow, and a soil inlet is formed in the bottom end of the probe rod. The sampling barrel is disposed in the probe rod. An opening of the bottom end of the sampling barrel faces to the soil inlet. The sampling barrel is detachably connected with the probe rod. The bottom end of the sampling barrel is spaced apart from the soil inlet. Two baffle plates are also arranged in the probe rod. The side wall of the baffle plate is arc-shaped, and the bottom end of the baffle plate is semicircular. The semicircular baffle plates can pass through the space and can be joined to form a cylinder with a closed bottom end. Two linear motors are fixedly arranged in the probe rod and can respectively drive the two baffle plates to move. The probe rod is further internally provided with a power supply, a programmable logic controller (PLC) and a displacement sensor. The linear motors, the power supply and the displacement sensor are respectively electrically connected with the PLC.

Preferably, the device for sampling soil of tropical lowland rainforest further comprises a base plate. A through hole is arranged at the center of the base plate, and its diameter is larger than the maximum diameter of the probe rod. The driving motor is connected with two support frames through a connecting rod, and the two support frames are respectively located on two sides of the driving motor and are respectively provided with handles. Two vertical columns are arranged on the base plate and are respectively located on two sides of the through hole. Each column of the two vertical columns passes through a corresponding handle of the handles, and the column fits for the corresponding handle in a sliding manner.

Preferably, a plurality of nonslip teeth are arranged at the bottom end of the base plate.

Preferably, the length of the column is larger than the length of the probe rod.

Preferably, line scales are formed on the side wall of one or two columns, and the line scales are axially distributed on the column.

Preferably, a rotating disc is arranged at the output shaft of the driving motor. An insertion rod is arranged on the rotating disc. A limiting hole is formed in a positioning plate corresponding to the insertion rod. The insertion rod is fixedly connected with the corresponding limiting hole. A plurality of positioning rods are arranged on the positioning plate, and positioning blocks corresponding to the positioning rods are formed in the outer wall of the probe rod. The positioning rod and the corresponding positioning rod are fixedly connected.

Preferably, a fixed block is arranged at the top end of the sample barrel and is fixedly connected with the robe rod through a screw. A plurality of screw holes with different heights are formed in the side wall of the probe rod corresponding to the screw. The screw is connected with one of the screw holes.

Preferably, the device for sampling soil of tropical lowland rainforest further comprises a sampling tube. A plurality of sampling holes are formed in the side wall of the sampling barrel and are distributed at intervals in the axial direction of the sampling barrel. A plastic film is arranged on the sampling hole. The sampling tube can be inserted into the sampling barrel through the sampling hole.

Preferably, one end of the sampling tube is open, and a push plate is fixedly arranged at the other end.

Compared with the prior art, the device for sampling soil of tropical lowland rainforest of the present invention achieves the following technical effects:

The device for sampling soil of tropical lowland rainforest of the present invention improves the efficiency and the success rate of soil sampling. In the device for sampling soil of tropical lowland rainforest of the present invention, the sampling barrel is located in the probe rod; so, the structure of the soil sampled by the sampling barrel is not influenced by the drilling of the probe rod, and the soil has excellent integrity. Furthermore, the baffle plates can block the soil inlet. Therefore, the soil cannot enter the sampling barrel until the probe rod drills to the preset depth. The soil in the preset soil layer is obtained, and influence of the soil in the surface layer on the experimental data is avoided. Additionally, the soil is prevented from dropping from the sampling barrel after the soil sampling is completed, thereby improving the success rate of the soil sampling. The sampling tube can obtain the different depths of soil samples, which is convenient to use.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 1 is a schematic structural diagram of a device for sampling soil of tropical lowland rainforest of the present invention.

Figure 1:
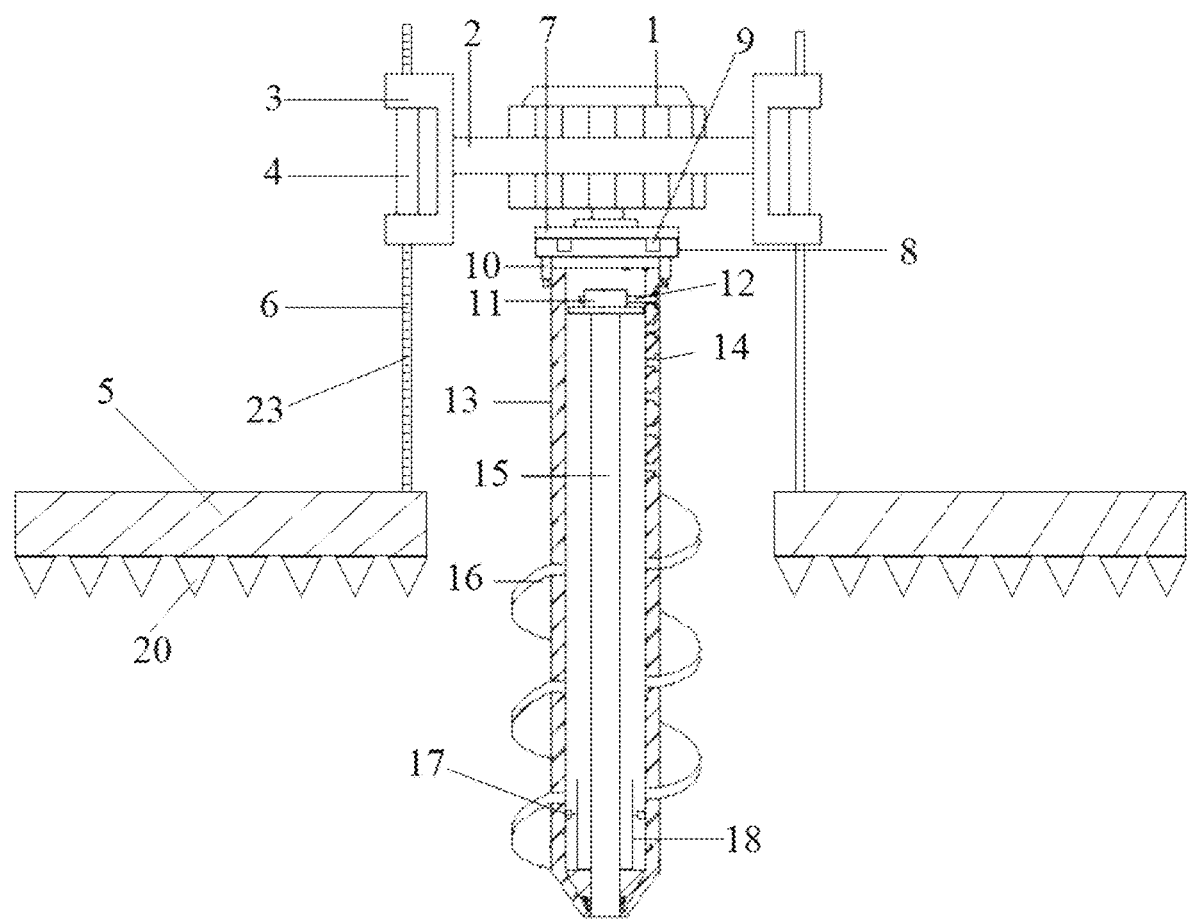

In the drawings: 1—driving motor, 2—connecting rod, 3—support frame, 4—handle, 5—base plate, 6—column, 7—rotating disc, 8—positioning plate, 9—insertion rod, 10—positioning block, 11—fixed block, 12—screw, (helical auger flight), 13—probe rod, 14—screw hole, 15—sampling barrel, 16—spiral coil, 17—linear motor, 18—baffle plate, 19—sampling hole, 20—nonslip tooth, 21—sampling tube, 22—push plate, and 23—line scale (depth-indicating marks).

DESCRIPTION OF THE EMBODIMENTS

The following clearly and completely describes the technical solutions in the embodiments of the present invention with reference to accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The objective of the present invention is to provide a device for sampling soil of tropical lowland rainforest, which solves the problems in the prior art and improves the efficiency and the success rate of sampling the soil, in particular the deep soil, of the tropical lowland rainforest.

To make the foregoing objective, features, and advantages of the present invention more apparent and more comprehensible, the present invention is further described in detail below with reference to the accompanying drawings and specific embodiments.

Figure 2:
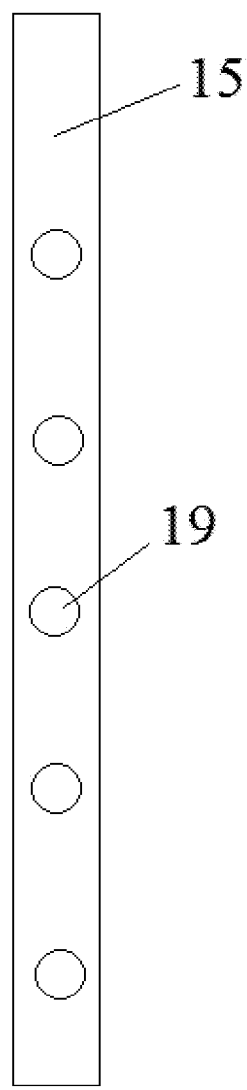
FIG. 2 is a schematic structural diagram of a sampling tube of a device for sampling soil of tropical lowland rainforest of the present invention.
Figure 3:
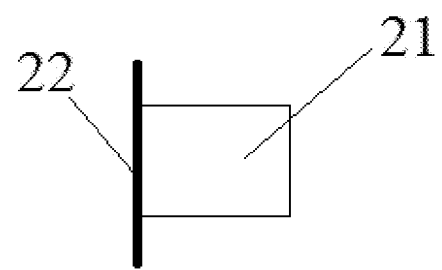
FIG. 3 is a schematic structural diagram of a sampler of a device for sampling soil of tropical lowland rainforest of the present invention.

As shown in FIG. 1 to FIG. 3, the embodiment provides a device for sampling soil of tropical lowland rainforest, comprising a driving motor 1, a probe rod 13, a sampling barrel 15, a base plate 5 and a sampling tube 21. An output shaft of the driving motor 1 is fixedly connected with the top end of the probe rod 13. A rotating disc 7 is arranged at the output shaft of the driving motor 1. An insertion rod 9 is arranged on the rotating disc 7. A limiting hole is formed in a positioning plate 8 corresponding to the insertion rod 9. The insertion rod 9 is fixedly connected with the corresponding limiting hole. A plurality of positioning rods are arranged on the positioning plate 8, and positioning blocks 10 corresponding to the positioning rods are formed in the outer wall of the probe rod 13. The positioning rod and the corresponding positioning rod 10 are fixedly connected.

A spiral coil 16 is fixedly arranged on the outer wall of the probe rod 13. A through hole is arranged at the center of the base plate 5, and its diameter is larger than the maximum diameter of the probe rod 13. The driving motor 1 is connected with two support frames 3 through a connecting rod 2, the two support frames 3 are respectively located on two sides of the driving motor 1 and are respectively provided with handles 4. Two vertical columns 6 are arranged on the base plate 5 and are respectively located on two sides of the through hole. Each column of the two vertical columns 6 passes through a corresponding handle 4 of the two handles 4 respectively, the column 6 fits for the corresponding handles 4 in a sliding manner, the length of the column 6 is larger than the length of the probe rod 13, line scales 23 are formed on the side wall of one or two columns 6, and the line scales 23 are axially distributed on the column 6. A plurality of nonslip teeth 20 are arranged at the bottom end of the base plate 5. In use, the base plate 5 fits the ground, and the nonslip teeth 20 are inserted into the soil to prevent the base plate 5 from slipping, thereby ensuring the normal sampling operation.

The probe rod 13 is hollow, and a soil inlet is formed in the bottom end of the probe rod 13. The sampling barrel 15 is disposed in the probe rod 13. An opening of the bottom end of the sampling barrel 15 faces to the soil inlet. The sampling barrel 15 is detachably connected with the probe rod 13. A fixed block 11 is arranged at the top end of the sample barrel 15 and is fixedly connected with the robe rod 13 through a screw 12. A plurality of screw holes 14 with different heights are formed in the side wall of the probe rod 13 corresponding to the screw 12. The screw 12 is connected with one of the screw holes 14. By arranging different heights of the screw holes 14, the different lengths of the sampling barrels 15 can be fixedly arranged in the probe rod 13 so as to improve the applicability.

The bottom end of the sampling barrel 15 is spaced apart from the soil inlet. Two baffle plates 18 are also arranged in the probe rod 13. The side wall of the baffle plate 18 is arc-shaped, and the bottom end of the baffle plate 18 is semicircular. The semicircular baffle plates 18 can pass through the space and can be joined to form a cylinder with a closed bottom end. Two linear motors 17 are fixedly arranged in the probe rod 13 and can respectively drive the two baffle plates 18 to move. The probe rod 13 is further internally provided with a power supply, a programmable logic controller (PLC) and a displacement sensor. The linear motors 17, the power supply and the displacement sensor are respectively electrically connected with the PLC.

A plurality of sampling holes 19 are formed in the side wall of the sampling barrel 15 and are distributed at intervals in the axial direction of the sampling barrel 15. A plastic film is arranged on the sampling hole 19 to prevent the soil from overflowing out of the sampling barrel 15 during sampling of the sampling barrel 15. The sampling tube 21 can be inserted into the sampling barrel 15 through the sampling hole 19. One end of the sampling tube 21 is open, and a push plate 22 is fixedly arranged at the other end.

The device for sampling soil of tropical lowland rainforest of the present invention is used as follows:

First, the base plate 5 is placed in a sampling area, the through hole in the center of the base plate 5 and the probe rod 13 are aligned to the sampling area, and the nonslip teeth 20 are inserted into the soil to prevent the base plate 5 from slipping. Second, the handles 4 are held to connect the driving motor 1 to the power supply which may be a normal domestic power supply of 220 V or a storage battery or a vehicle power supply, etc. Third, the driving motor 1 is turned on to drive the probe rod 13 to drill downwards; during the drilling, an operator may know the drilling depth of the probe rod 13 by observing the line scales 23 on the side wall of the column 6, so the operator can conveniently control the drilling depth of the probe rod 13. Fourth, the handle 4 moves downwards along the columns 6; the displacement sensor feeds back the displacement distance of the probe rod 13 to the PLC; when the probe rod 13 moves downwards to the preset sampling depth, the PLC controls the two baffle plates 18 to separate through the linear motors 17 such that the soil inlet is communicated with the opening of the bottom end of the sampling barrel 15; the probe rod 13 continuously drills downwards such that the soil enters the sampling barrel 15; after the probe rod 13 moves downwards to a preset sample stop depth, the PLC controls the two baffle plates 18 to combine through the linear motors 17; the two semicircular baffle plates 18 are combined to form a complete round baffle plate so as to separate the soil inlet from the sampling cylinder 15, the driving motor 1 can be lifted up at this time, and the soil in the sampling barrel 15 does not drop down under the support of the round baffle plate so that the success rate of soil sampling is high. Finally, the sampling barrel 15 is taken out of the probe rod 13, the plastic film over the sampling hole 19 is torn down, and the different depths of soil samples can be taken out through the sampling tube 21.

The device for sampling soil of tropical lowland rainforest of the embodiment is provided with two probe rods 13 of different depths, namely 1 m and 2 m. Each probe rod 13 is provided with a proper sampling barrel 15 for sampling different depths of the soil. It should be noted that the depth of the probe rod 13 in the device for sampling soil of tropical lowland rainforest of the present invention is not limited in the embodiment, and the user can properly design the depth of the probe rod 13 according to the actual situation.

In the description of the present invention, it should be noted that orientations or position relationships indicated by terms "center", "top", "bottom", "vertical", "inner", "outer", etc. are orientations or position relationships as shown in the drawings, and these terms are just used to facilitate description of the present invention and simplify the description, but not to indicate or imply that the mentioned apparatus or elements must have a specific orientation and must be established and operated in a specific orientation, and thus, these terms cannot be understood as a limitation to the present disclosure.

Several examples are used for illustration of the principles and implementation methods of the specification. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the present invention.

What is claimed is:

1. A device for sampling soil of tropical lowland rainforest, comprising a driving motor, a probe rod and a sampling barrel, wherein an output shaft of the driving motor is fixedly connected with a top end of the probe rod; a spiral coil is fixedly arranged on an outer wall of the probe rod; the probe rod is hollow, and a soil inlet is formed in a bottom end of the probe rod; the sampling barrel is disposed in the probe rod; an opening of the bottom end of the sampling barrel faces to the soil inlet; the sampling barrel is detachably connected with the probe rod; the bottom end of the sampling barrel is spaced apart from the soil inlet; two baffle plates are arranged in the probe rod; the side wall of the baffle plate is arc-shaped, and the bottom end of the baffle plate is semicircular; the semicircular baffle plates can pass through the space and can be joined to form a cylinder with a closed bottom end; two linear motors are fixedly arranged in the probe rod to respectively drive the two baffle plates to move; the probe rod is further internally provided with a power supply, a programmable logic controller (PLC) and a displacement sensor; the linear motors, the power supply and the displacement sensor are respectively electrically connected with the PLC.

2. The device for sampling soil of tropical lowland rainforest according to claim 1, further comprising a base plate, wherein a through hole is arranged at the center of the base plate, and its diameter is larger than a maximum diameter of the probe rod;

the driving motor is connected with two support frames through a connecting rod; the two support frames are respectively located on two sides of the driving motor and are respectively provided with handles; two vertical columns are arranged on the base plate and are respectively located on two sides of the through hole; each column of the two vertical columns passes through a corresponding handle of the handles, and the column fits for the corresponding handle in a sliding manner.

3. The device for sampling soil of tropical lowland rainforest according to claim 2, wherein a plurality of nonslip teeth are arranged at the bottom end of the base plate.

4. The device for sampling soil of tropical lowland rainforest according to claim 2, wherein the length of the column is larger than the length of the probe rod.

5. The device for sampling soil of tropical lowland rainforest according to claim 2, wherein line scales are formed on the side wall of one or two columns, and the line scales are axially distributed on the column.

6. The device for sampling soil of tropical lowland rainforest according to claim 1, wherein a rotating disc is arranged at the output shaft of the driving motor; an insertion rod is arranged on the rotating disc; a limiting hole is formed in a positioning plate corresponding to the insertion rod; the insertion rod is fixedly connected with the corresponding limiting hole; a plurality of positioning rods are arranged on the positioning plate, and positioning blocks corresponding to the positioning rods are formed in the outer wall of the probe rod; the positioning rod and the corresponding positioning rod are fixedly connected.

7. The device for sampling soil of tropical lowland rainforest according to claim 1, wherein a fixed block is arranged at the top end of the sampling barrel and is fixedly connected with the probe rod through a screw; a plurality of screw holes with different heights are formed in the side wall of the probe rod corresponding to the screw; the screw is connected with one of the screw holes.

8. The device for sampling soil of tropical lowland rainforest according to claim 1, further comprising a sampling tube, wherein a plurality of sampling holes are formed in the side wall of the sampling barrel and are distributed at intervals in the axial direction of the sampling barrel; a plastic film is arranged on the sampling hole; the sampling tube can be inserted into the sampling barrel through the sampling hole.

9. The device for sampling soil of tropical lowland rainforest according to claim 8, wherein one end of the sampling tube is open, and a push plate is fixedly arranged at the other end.

* * * * *